March 15, 1938.  V. W. KLIESRATH  2,111,290
CLUTCH CONTROL MECHANISM
Filed July 18, 1934
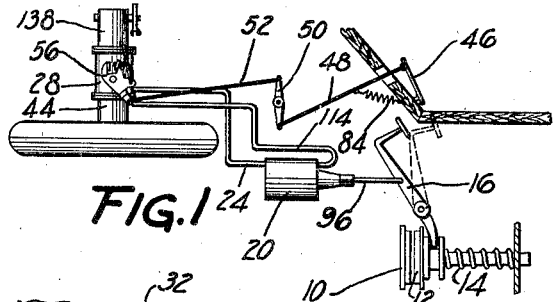
FIG. 1
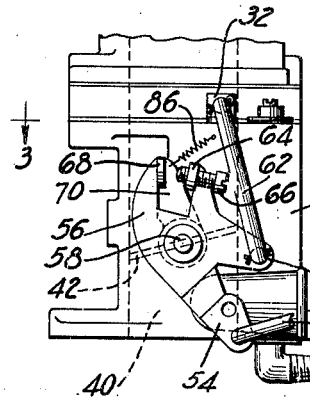
FIG. 2
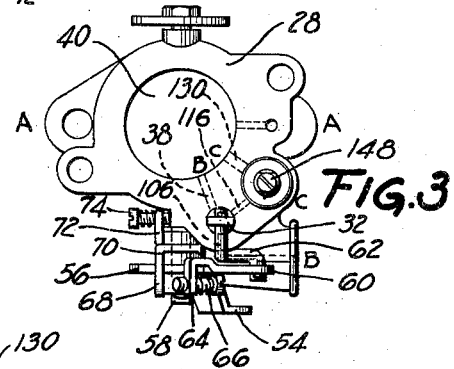
FIG. 3
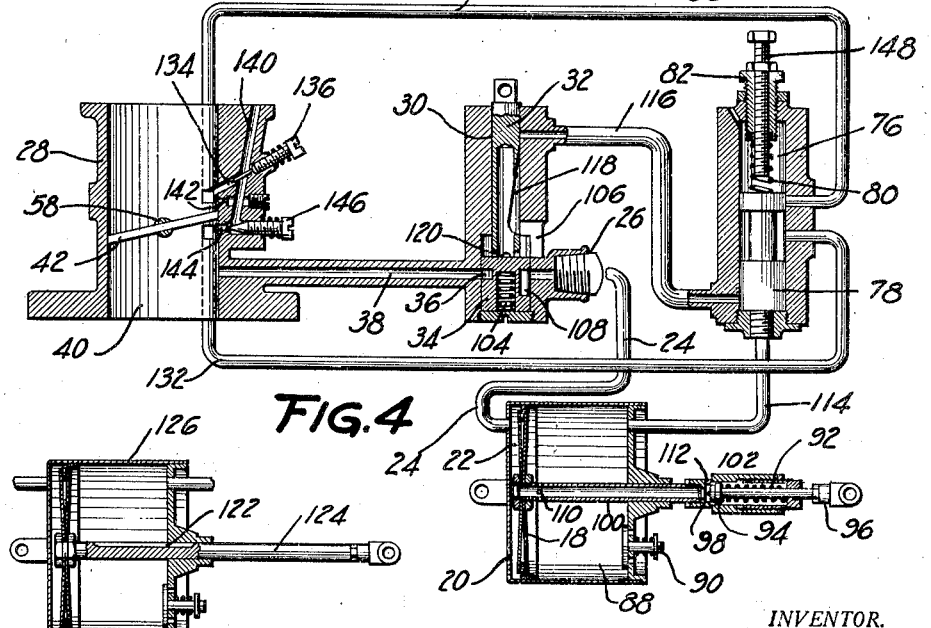
FIG. 4
FIG. 5
INVENTOR.
VICTOR W. KLIESRATH
BY
ATTORNEY Patented Mar. 15, 1938

2,111,290

UNITED STATES PATENT OFFICE 2,111,290

CLUTCH CONTROL MECHANISM

Victor W. Kliesrath, South Bend, Ind., assignor to Bendix Products Corporation, South Bend, Ind., a corporation of Indiana Application July 18, 1934, Serial No. 735,904

9 Claims. (Cl. 192—.01)

This invention relates in general to clutch operators, and more particularly to power means controlled in part by the accelerator for so disengaging and engaging the clutch as to simulate an expert manual operation thereof.

The mechanisms of this character disclosed in the prior art, and acknowledged hereinafter provide power means automatically operable to engage the clutch in two stages of movement, the first stage being relatively fast, terminating when the clutch plates contact at a predetermined load, and the second stage being relatively slow to effect the desired acceleration of the vehicle. It often happens, however, that the engine is delivering insufficient torque when the clutch plates are first loaded, resulting in a jerking of the vehicle and a possible stalling of the engine. The instant invention is accordingly in part directed to the provision of means for obviating this objectionable feature.

To this end there is provided means, operable by the clutch as a prime mover, for automatically injecting a charge of fuelized air (combustion mixture) into the intake manifold immediately after the clutch plates are first loaded, thus insuring sufficient torque of the driving clutch plate to obviate a jerking clutch and resulting in a smooth start of the vehicle.

The most important feature of the invention, however, lies in the provision of a combined clutch and engine control unit constituting part of a power means for operating the clutch and engine, said unit being built into the carburetor. Such a construction simplifies similar mechanism of the prior art in that with the instant invention but two units are required to control the clutch and admission of fuel to the internal-combustion engine; namely, a carburetor unit and a cylinder unit, the latter being connected to the clutch. In the mechanisms of the prior art, however, three separate units were required; namely, a carburetor, a cylinder and a valve.

The invention further contemplates the provision of power means operable both to control the clutch and the engine in such fashion as to effectively engage and disengage the clutch and also speed up the engine just as the clutch is picking up the load of the car, or the engine, as the case may be.

Yet another object of the invention is to provide a clutch and engine control means wherein a combined three-way and bleed valve unit is built into a carburetor unit together with a valve designed both to control the bleed valve and the injection of a charge of fuelized air into the intake manifold.

Other objects of the invention and desirable details of construction and combinations of parts will become apparent from the following description of a preferred embodiment, which description is taken in conjunction with the accompanying drawing, in which:

Figure 1 is a diagrammatic view, in side elevation, disclosing the essential elements of my invention;

Figure 2 is an enlarged view of the combined carburetor and built-in clutch and engine control unit of Figure 1;

Figure 3 is a plan view of a mechanism of Figure 2 taken on the line 3—3 thereof;

Figure 4 is an enlarged diagrammatic or rather schematic view, in section, disclosing the essential elements of the invention, the disclosed sections being taken on lines A—A, B—B and C—C of Figure 3; and Figure 5 is a sectional view of a modified form of clutch motor construction.

In that embodiment of the invention selected for illustration there is diagrammatically disclosed in Figure 1 a conventional clutch comprising driving and driven plates 10 and 12 and a clutch spring 14, the driven plate being operatively connected to a conventional clutch pedal 16. The pedal is connected to a piston 18 reciprocable within a cylinder 20, the two constituting a pressure differential operated clutch motor. Details of the connection between the piston 18 and the pedal 16 are briefly described hereinafter; however, the same are not claimed herein, inasmuch as they constitute the inventions of Roy S. Sanford, application No. 645,298, filed December 11, 1932; of Victor W. Kliesrath, application No. 721,683, filed April 21, 1934, and of Roy S. Sanford, application No. 685,719, filed August 18, 1933.

The clutch operating motor is adapted to be energized by evacuating a left compartment 22 of the same. To this end the cylinder 20 is connected, by a conduit 24, to the induction passage of an internal-combustion engine, the conduit being tapped at 26 into a throttle housing section 28 constituting the essence of the invention. The housing, which is preferably formed as a casting, is bored at 30 to receive a reciprocable hollow plunger 32, described in greater detail hereinafter. A plunger member 34, housed within a bore 35, is provided with an annular recess 36 adapted to interconnect conduit 24 and a cross bore 38 in the housing, the latter communicating with a main intake bore 40 of the housing between a throttle valve 42 and an intake manifold riser 44. There is thus provided a fluid transmitting connection between the cylinder 20 and the manifold riser, when the plunger 34 is in its lowermost position, as disclosed in Figure 4.

The plunger 32 is, in part, connected to an accelerator pedal 46 by links 48, 50 and 52, the latter being connected to a projecting tab 54 on a lever member 56 comprising a stamping loosely mounted on a throttle shaft 58. The shaft 58 is rotatably mounted in the housing 28, the butterfly or throttle valve 42 being fixedly secured to the shaft in the usual manner. The stamping member 56 is provided with an extension 60 to which is secured to a link 62, said link being connected at its upper end to the plunger 32. The lever member is further provided with a right-angularly extending tab 64 on which is threadedly mounted a thrust screw 66 adapted to contact a tab or stop 68 extending from a crank member 70 fixedly secured to the throttle shaft. The member 70 is also provided with a tab 72 in which is adjustably mounted a stop 74 adapted to abut against the throttle housing and determine the closed or idle position of the throttle valve 42.

The housing 28 is further provided with a vertically-extending bore 76 in juxtaposition with and parallel, or substantially parallel, with the bore 30. Within the bore 76 there is reciprocably mounted a spool-shaped piston valve member 78 normally biased, to the position disclosed in Figure 4, by a spring 80, the latter interposed between one end of the piston and a plug 82 threadedly mounted in the housing above the bore 76. The function of the valve member 78 will be described hereinafter.

Describing now the operation of the invention, with the accelerator released, under the action of a spring 84, member 56 is rotated clockwise, permitting the throttle 42 to close under the action of a spring 86 and moving plungers 32 and 34 downwardly to the position disclosed in Figure 4. As previously described, the cylinder 20 is thus placed in communication with the manifold via bore 38, recess 36 in plunger 34, and conduit 24, resulting in an evacuation of the compartment 22 of the cylinder and a forcing of the piston 18 and its connected clutch pedal to the clutch disengaged full-line position disclosed in Figures 1 and 4. Air under atmospheric pressure is admitted to a right compartment 88 of the cylinder 20 via a one-way check valve 90 to effect this operation.

As is well known in this art, there exists in the manifold at closed throttle a vacuum of some twenty inches of mercury; this by virtue of the pumping action of the idling motor pistons.

The first increment of movement of the piston 18 in the aforementioned disengagement of the clutch results in the compression of a spring 92, which is weaker than the clutch spring 14, resulting in the opening of a valve member 94, constituting one end of a connection 96 with the clutch. A seat 98, within one end of a connection 100 with the piston 18, constitutes the remaining element of the valve mechanism indicated generally by the numeral 102. The valve 102 is not described in particular detail herein, inasmuch as the same constitutes the essential feature of the aforementioned pending applications.

The clutch now being disengaged, the driver will select the desired gear ratio, whereupon the accelerator is depressed to reengage the clutch and accelerate the vehicle. In effecting the latter operation the plunger 32 is moved upwardly by the first increment of movement of the accelerator, the plunger 34 following by virtue of the action of a spring 104. As a result of this movement the plunger 34 is moved sufficiently to cut off communication between recess 36 and bore 38 and subsequently interconnect the conduit 24 with the atmosphere via a vent slot 106 in the throttle housing and an extension 108 of the recess 36. The left compartment 22 of the cylinder 20 is thus vented to atmosphere, reducing the pressure differential acting on the piston 18 to zero and permitting the clutch to reengage under the action of its spring.

The first movement of the clutch during its reengagement is relatively rapid by virtue of the relatively rapid egress of air via openings 110 and 112 in connection 100, the openings 112 being uncovered by the open valve 94. When the clutch plates contact at a predetermined load, determined by the adjustment of the spring 92, the valve 94 is seated, thereby slowing up or cushioning the engagement of the clutch, a continued engagement at a relatively slow rate being effected by virtue of the relatively slow egress of air from the cylinder via a conduit 114, a cross bore 116 in housing 28, a tapered slot 118 in plunger 32, openings 120 in said plunger and the vent slot 106. The valve 102 is adjusted to terminate the rapid stage of clutch engagement just as the clutch plates are loaded sufficiently to effect the initial driving engagement of the clutch, and the rate of the remaining engagement is determined by the depth of the slot 118 exposed to the bore 116, which in turn is determined by the extent of depression of the accelerator. If desired, the valve 102 of Figure 4 may be dispensed with and in its place a simpler construction provided, including a slot 122 in a connection 124, Figure 5. A cylinder 126 and piston 128 are similar in construction to the mechanism disclosed in Figure 4. The slot 122 of Figure 5 provides a means for rapidly venting the air from the right compartment of the cylinder up to a point of clutch plate contact, whereupon the slot is covered by the end wall of the cylinder, terminating the relatively rapid engaging movement of the clutch.

One of the important features of the invention is in the function of the spool valve 78, which serves a dual purpose in (1) connecting the bleed slot 118 with the cylinder to permit the cushioned engagement of the clutch and (2) in by-passing a charge of fuelized air around the throttle 42 via cross bores 130 and 132 in the throttle housing. This latter operation serves to momentarily increase the R. P. M. of the engine, thus increasing the torque of the driving clutch plate just when most needed; that is, when the clutch plates are first loaded. In order to effect this operation there is provided a so-called fast idle discharge jet 134, the quantity of charge admitted thereto being determined by an adjustment needle valve 136. Fuel is fed from an idling supply system, incorporated in a standard type of down-draft carburetor mechanism 138, Figure 1, via a bore 140, or idle discharge channel, to upper and lower idle discharge jets 142 and 144 respectively, the latter being regulated by a so-called slow idle needle valve 146. The mechanisms 28 and 138 together constitute the complete carburetor of the engine.

In normal operation with the throttle closed, as disclosed in Figure 4, the slow idle jets provide a means for idling the engine. When the clutch plates contact, however, closing valve 102, continued engaging movement of the clutch serves to compress the air in the right compartment of the cylinder, resulting in a forcing of the valve piston 78 upwardly to interconnect the bores 130 and 132 and also interconnect conduit 114 and bore 116, as previously described. If the accelerator has only been opened sufficiently to just barely register bleed slot 118 with bore 116, as may well be the case in maneuvering the car in parking, and without opening the throttle, then the engine might readily be stalled; this by virtue of an insufficient engine torque for a given vehicle load. With the present invention, however, a charge of combustible mixture is drawn into the manifold, via the fast idle jet 134 and bores 130 and 132, so long as the piston 78 is in its uppermost position under the action of the cushioning clutch. It will furthermore be noted that with the vehicle in motion and the clutch disengaged the driving clutch plate is more quickly brought up to the speed of the driven clutch plate, when it is desired to reengage the clutch and assuming that the driver fails to depress the accelerator sufficiently to open the throttle.

Of course, when starting the vehicle, if the accelerator is depressed further to open the throttle, the effect of this supplementary fuel charge is in a large measure destroyed, the combustible mixture then passing directly into the manifold via the open throttle.

It will be noted, therefore, that the mechanism of the invention to a large extent prevents an inadvertent stalling of the engine and that the driving clutch plate is speeded up to increase its torque just at the critical moment; namely, as the driving engagement of the clutch is being completed. The rate of supply of the supplemental charge with the consequent determination of the engine R. P. M. may be varied by a stop 148, determining the degree of overlap between the top of the piston 78 and the mouth of the bore 132, as will be apparent from an inspection of Figure 4.

It will be further noted that the lost motion between the stop 68 and the thrust member 66 provides a means for completely closing the throttle before the plunger 34 is moved to effect a disengagement of the clutch, and likewise, as has been previously described, the plungers 32 and 34, which together constitute what is known as a three-way valve mechanism, are operated to initiate an engagement of the clutch before the throttle is opened.

Summarizing the operation of the above described mechanism, upon release of the accelerator the three-way control valve mechanism 32, 34 is operated to interconnect the intake manifold with the left compartment 22 of the clutch motor via conduit 24 and bore 38. The piston 18 of the clutch motor is then moved to disengage the clutch by virtue of the differential of pressures acting on the piston. When it is desired to reengage the clutch, the accelerator is depressed, thus operating valve 32, 34 to vent the compartment 22. The piston 18 is, under the action of the clutch springs, then moved to the right in the cylinder 20 to thus initiate the clutch engaging operation. When the clutch plates contact, the valve 94 is automatically closed to terminate the first and rapid stage of clutch engaging movement, and at the same time the valve 78 is automatically opened to permit a bleed of air from the right compartment 88 of the clutch motor via conduit 114, bore 116 and slot 118, which is in valve member 32. With the operation of the valve 78, the combustible mixture to the engine is increased, the auxiliary charge of mixture flowing via the fast idle jet 134 and bores 130 and 132. The engine torque is thus automatically increased, when the clutch plates contact, thus obviating any possibility of stalling the engine.

There is thus provided a very simple, compact and effective combined clutch and engine control mechanism, the control elements of the mechanism being built into and forming an adjunct of the carburetor mechanism, thus simplifying the mechanism and providing a structure which may well be adapted with equal facility to both new cars in factory assembly and also to used cars in the field.

While one illustrative embodiment has been described, it is not my intention to limit the scope of the invention to that particular embodiment, or otherwise than by the terms of the appended claims.

I claim:

1. In an automotive vehicle provided with a clutch and a carburetor having a throttle, power means operable to disengage the clutch, and further operable to synchronously control the engagement of the clutch and the speed of the engine by supplementing the operation of the throttle, said means including an automatically operable power operated valve for effecting its function of supplementing the operation of the throttle.

2. In an automotive vehicle provided with a throttle and a clutch, power means operable jointly to disengage and engage the clutch and, at a predetermined time during the engagement of the clutch, to supplement an operation of the throttle to momentarily speed up the engine, said means including an automatically operable power operated valve for effecting its throttle supplementing function.

3. In an automotive vehicle provided with a throttle, means for supplementing the operation of said throttle, and a clutch having driving and driven members, power means for controlling the operation of the clutch and supplementing means, said power means comprising pneumatically operated means operative, when the clutch members are loaded to a predetermined degree, to initiate the operation of said first mentioned means.

4. In an automotive vehicle provided with a throttle and a clutch, power means for controlling the operation of the clutch including a pressure differential operated motor, said means including means, controlled by the gaseous pressure within one end of the aforementioned motor, for supplementing the operation of the throttle as the clutch is being engaged.

5. In an automotive vehicle provided with a clutch, an accelerator and a throttle, power means for operating the clutch including a double-ended pressure differential operated motor, said power means further comprising means controlled by the pressure within the right compartment of the aforementioned motor, which means, together with the accelerator, function to supplement the operation of the throttle.

6. In an automotive vehicle provided with an internal-combustion engine having a throttle, an accelerator and a clutch, pressure differential operated clutch controlling means, said means comprising valve means operative both to synchronously control the engagement of the clutch and to so supplement the operation of the throttle as to speed up the engine, and valve means directly connected with the accelerator, said valve means being operative to initiate the clutch disengaging and engaging operations of said pressure differential operated means.

7. In an automotive vehicle provided with an intake manifold, a carburetor having a butterfly valve and a riser interconnecting said valve and manifold, and further provided with a clutch having driving and driven elements, power means operative, when said clutch elements are loaded to a predetermined degree, to by-pass a charge of fuelized air around said butterfly valve and into said riser, said means including a power operated valve.

8. A combined clutch and internal-combustion engine control means comprising a throttle housing provided with three juxtaposed bores, one of said bores housing a throttle valve and the other two bores housing valve means for controlling the clutch and engine.

9. In an automotive vehicle provided with a clutch and an internal-combustion engine provided with an intake manifold, means for increasing the R. P. M. of the engine during the engagement of the clutch comprising a throttle housing, a throttle therein, said housing bored above and below said throttle, means for supplying fuel to one of said bores, and power operated valve means for interconnecting said bores whereby a charge of fuelized air is injected into the manifold during the operation of the clutch.

VICTOR W. KLIESRATH.

CERTIFICATE OF CORRECTION.

Patent No. 2,111,290. March 15, 1938.

VICTOR W. KLIESRATH.

It is hereby certified that error appears in the printed specification of the above numbered patent requiring correction as follows: Page 3, second column, line 55, claim 4, after the word "means" insert further; and that the said Letters Patent should be read with this correction therein that the same may conform to the record of the case in the Patent Office.

Signed and sealed this 11th day of July, A. D. 1939.

Henry Van Arsdale (Seal) Acting Commissioner of Patents.